(12) United States Patent
Mehra et al.

(10) Patent No.: US 9,351,594 B2
(45) Date of Patent: May 31, 2016

(54) METHOD AND SYSTEM FOR WIRING A PICTURE FRAME AND GENERATING TEMPLATES TO HANG PICTURE FRAMES IN VARIOUS LAYOUTS

(71) Applicant: Art.Com, Inc., Emeryville, CA (US)

(72) Inventors: Madhav Mehra, Emeryville, CA (US); Timothy Stevens, Emeryville, CA (US)

(73) Assignee: ART.COM, INC., Emeryville, CA (US)

( * ) Notice: Subject to any disclaimer, the term of this patent is extended or adjusted under 35 U.S.C. 154(b) by 480 days.

(21) Appl. No.: 13/831,589

(22) Filed: Mar. 15, 2013

(65) Prior Publication Data

US 2014/0259718 A1 Sep. 18, 2014

(51) Int. Cl.
*A47G 1/20* (2006.01)
*G01B 3/02* (2006.01)
*G06Q 30/06* (2012.01)

(52) U.S. Cl.
CPC . *A47G 1/205* (2013.01); *A47G 1/20* (2013.01); *G01B 3/02* (2013.01); *G06Q 30/0603* (2013.01)

(58) Field of Classification Search
CPC ........... G01B 3/02; A47G 1/205; A47G 1/20; G06Q 30/0603
USPC ........... 33/451, 528, 533, 562, 574, 576, 577, 33/613, 644, 645, 666, 673, 677, 679
See application file for complete search history.

(56) References Cited

U.S. PATENT DOCUMENTS

| | | | | |
|---|---|---|---|---|
| 3,371,423 A | * | 3/1968 | Paul .......................... | B25H 7/00 33/464 |
| 4,241,510 A | | 12/1980 | Radecki | |
| 5,129,154 A | * | 7/1992 | Aydelott ................... | B25H 7/04 248/542 |
| 5,238,271 A | * | 8/1993 | Nirmel ..................... | A47G 1/205 283/67 |
| 5,361,510 A | | 11/1994 | Cox | |
| 5,398,906 A | * | 3/1995 | Aydelott ................. | A47G 1/205 248/477 |
| 5,471,760 A | * | 12/1995 | Farris ...................... | A47G 1/205 33/427 |
| 5,509,213 A | * | 4/1996 | Kelly ...................... | A47G 1/205 33/451 |
| 5,867,917 A | * | 2/1999 | Karon ..................... | A47G 1/205 33/613 |

(Continued)

OTHER PUBLICATIONS

Bradford, A., "How to Attach a Wire Hanger on a Picture," www.eHow.com, Demand Media, Inc., accessed Dec. 20, 2013, http://www.ehow.com/how_771365_attach-wire-hanger-picture.html.

(Continued)

*Primary Examiner* — R. A. Smith
*Assistant Examiner* — Tania Courson
(74) *Attorney, Agent, or Firm* — Perkins Coie LLP (57) ABSTRACT

Disclosed here are methods, devices, paradigms and structures for wiring a picture frame, and for generating user defined templates for hanging picture frames wired using the device in various layouts. The device allows the maker of the frame to install a hanging wire to the frame at a predefined position, for example, at a predefined distance from a top edge of the frame. A spring-loaded peg mounted on a flat slab, at a predefined distance from a wall member of the device, allows wiring the frame such that the apex of the wire is at the predefined distance from the top edge of the frame. The frame is placed in the device with the top edge of the frame adjacent to the wall member. The flat slab is configured to move vertically on a channel guide mounted on the wall member to accommodate varying thickness of the frame.

13 Claims, 10 Drawing Sheets

(56) References Cited

U.S. PATENT DOCUMENTS

| | | | | |
|---|---|---|---|---|
| 6,473,984 B1* | 11/2002 | Splain | .................... | G01B 5/004 33/613 |
| 6,618,955 B2* | 9/2003 | Rice | ....................... | A47G 1/205 33/1 B |
| 6,880,259 B1* | 4/2005 | Schultz | .................... | G01C 9/28 33/1 G |
| 6,883,244 B2* | 4/2005 | Rimback | ................ | A47G 1/205 33/451 |
| 6,898,862 B1* | 5/2005 | Oberst | .................... | A47G 1/205 33/574 |
| 6,966,534 B2 | 11/2005 | Kamenstein et al. | | |
| 6,971,184 B2* | 12/2005 | Prevost | .................. | G01C 15/02 33/577 |
| 7,155,840 B1* | 1/2007 | Carbonaro | ............. | A47G 1/205 33/451 |
| 7,503,126 B2* | 3/2009 | Robins | ..................... | G01C 9/28 33/613 |
| 7,607,631 B2* | 10/2009 | Newman | .................. | A47G 1/18 248/331 |
| 8,250,774 B2* | 8/2012 | Townsend | ............. | A47G 1/205 33/613 |
| RE44,504 E* | 9/2013 | Schultz | .................... | G01C 9/28 33/1 G |
| 9,032,637 B2* | 5/2015 | Propp | ..................... | B25H 7/04 33/613 |
| 2004/0177527 A1 | 9/2004 | Prevost | | |
| 2006/0196069 A1* | 9/2006 | Groepper | ............... | A47G 1/205 33/613 |
| 2007/0234584 A1* | 10/2007 | Robins | ..................... | G01C 9/34 33/613 |
| 2008/0196262 A1* | 8/2008 | Bommarito | ............ | A47G 1/205 33/613 |
| 2009/0313843 A1* | 12/2009 | Compton | ................ | A47G 1/205 33/613 |
| 2010/0116964 A1* | 5/2010 | Aleo | ....................... | A47G 1/164 248/476 |
| 2010/0325905 A1* | 12/2010 | Coyle | ....................... | G01B 3/14 33/332 |
| 2012/0246957 A1* | 10/2012 | Daniel | ................... | A47G 1/205 33/645 |

OTHER PUBLICATIONS

Bulldog Hardware, bulldoghardware.com, accessed Dec. 20, 2013, http://bulldoghardware.com/pictureHanging/concept21_0117.swf.

Bwyan, "Make acoustic panels for your recording studio or home theater," instructables.com, Autodesk, Inc., accessed Dec. 20, 2013, http://www.instructables.com/id/Make-accoustic-panels-for-your-recording-studio-or/step9/Install-the-picture-wire/.

Doland, Erin, et al., "unclutterer," unclutterer.com, accessed Dec. 20, 2013, http://unclutterer.com/2011/04/04/easily-hang-an-organized-photo-gallery-with-the-perfectpicturewall/.

Jones, BradLee, "Wire a Picture Frame: The Right Way." *YouTube* video, 9:41, accessed on Dec. 20, 2013, http://www.youtube.com/watch?v=8taggsQbF4Y.

Marzka, Kelly, "Frame Hanging Hack: How to Get IKEA Ribba Frames to Behave," www.viewalongtheway.com, accessed Dec. 20, 2013, http://www.viewalongtheway.com/2011/08/frame-hanging-hack-how-to-get-ikea-ribba-frames-to-behave/.

www.picturewall.com, accessed Dec. 20, 2013, http://www.picturewall.com/.

* cited by examiner

METHOD AND SYSTEM FOR WIRING A PICTURE FRAME AND GENERATING TEMPLATES TO HANG PICTURE FRAMES IN VARIOUS LAYOUTS

FIELD OF INVENTION

This invention relates to wiring picture frames and more specifically to a device for installing a hanging wire to a picture frame at a known position, and to generating templates using a computer or mobile device for hanging the picture frames in various layouts.

BACKGROUND

Picture frames (or "frames") can be hung on a wall using various hanging means. Wall hooks, saw tooth hangers, hanging wires etc. are some examples of hanging means. The hanging means for different frames are attached at different positions in the frames, especially if the frames are made by different art merchants. An end user intending to hang the frames in a particular layout may place the fasteners for the frames on the wall accordingly to hang the frames. In the example 100 of FIG. 1, an end user intending to hang a number of picture frames 105 in a layout where the top edges of the frames 105 are horizontally aligned, installs fasteners 115 on the wall in an horizontally aligned manner, as shown by horizontal line 110 in FIG. 1. However, the top edges of the frames 105 may not be horizontally aligned because of the varying positions of the hanging means on the frames 105. Thus, the frames 105 may not be arranged in the layout the end user desired.

Figure 1:
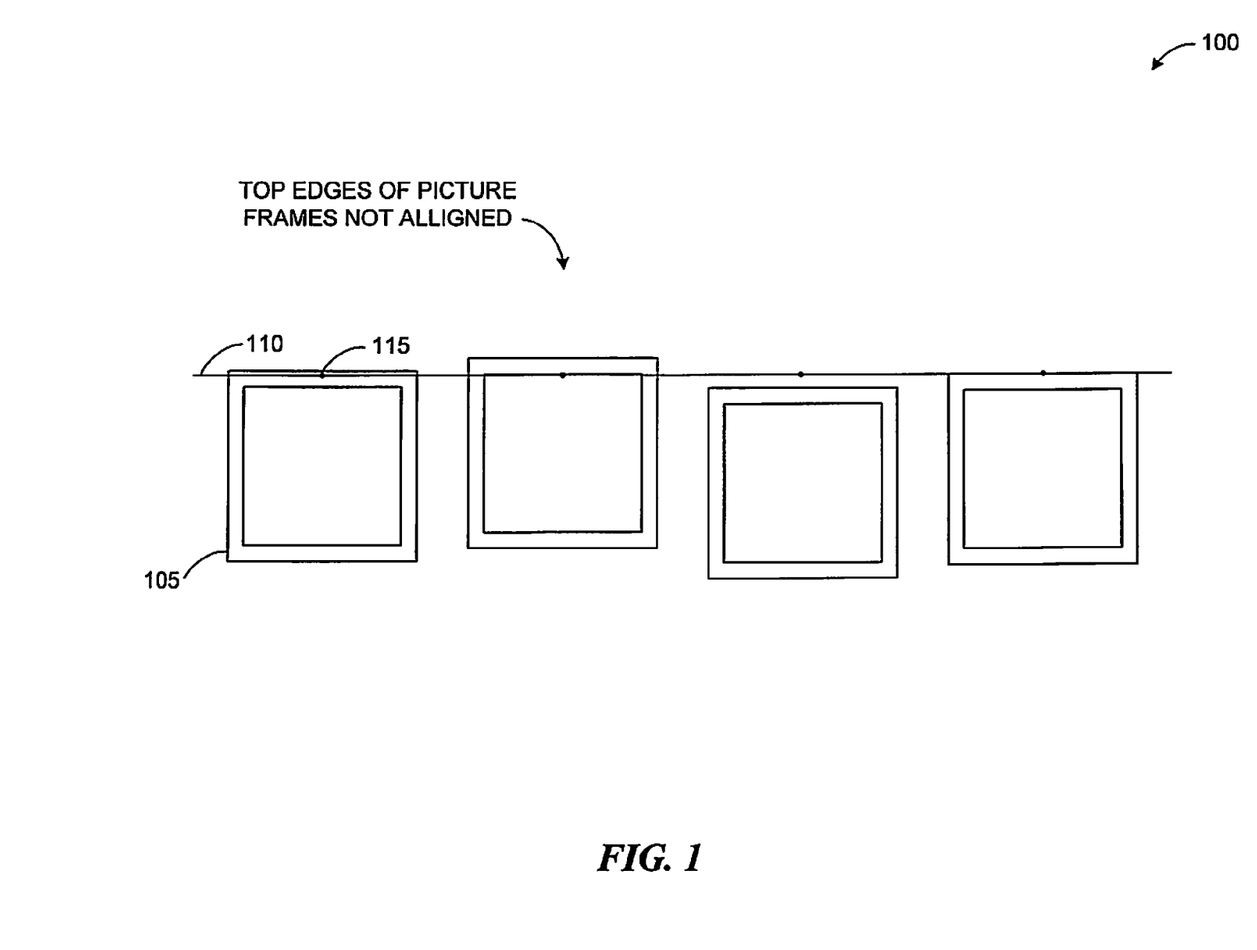
FIG. 1 is an example showing an arrangement of picture frames having hanging wires attached at different positions with respect to the top edge of the picture frames.

Regardless of the means used in the frames for hanging, a user who wants to the hang the pictures in a particular layout, typically has to take into consideration the varying positions of the hanging means. One possible way to do this is measure the distance between the top edge of a frame and the hanging means of the frame, and place the fastener on the wall accordingly. This is a complex, tedious, and time consuming process if there are many frames to be hung, as the end user is required to take the measurements for the all the frames to ensure the picture frames are hung on the wall in the desired layout. Further, even if the distances are measured and the fasteners are placed accordingly, the layout may change if the position of one or more frames 105 are changed in the arrangement. For example, if a position of the first picture frame is switched with a position of the second picture frame in the example 100, the top edges of the two frames may not be aligned since the fasteners were installed considering the position of the hanging means of a particular frame.

SUMMARY

Introduced here are methods, systems, paradigms and structures for wiring a picture frame, and for generating user defined templates for hanging picture frames wired using the device in various layouts. The device allows the maker of the frame to attach a hanging wire to the frame at a predefined position, for example, at a predefined distance from a top edge of the frame so that the frame may be subsequently hung on a wall at a desired position or layout by an end user without the use of special purpose tools.

The device includes a spring-loaded peg mounted on a flat slab to hold a hanging wire at its apex when the hanging wire is drawn around the spring-loaded peg. The spring-loaded peg also allows an easy release of the hanging wire when the spring-loaded peg is pressed. The flat slab is configured to move vertically on a channel guide mounted on a wall member of the device to accommodate varying thickness of the frame. The frame is placed in the device with the top edge of the frame adjacent to the wall member. The spring-loaded peg is mounted on the flat slab at a predefined distance from the wall member. When the wire is drawn around the spring-loaded, the distance between the apex of the wire and the top edge of the frame corresponds to the predefined distance. Accordingly, the device allows the hanging wire to be attached to the frames at a predefined position.

Further, embodiments of the disclosed technique also include an online platform for generating templates for hanging the picture frames on the wall in various layouts. A template may be generated, printed, or created on a flexible material, such as a paper. The template includes a manifestation (or "representation") of a plurality of picture frames in a particular layout. The dimensions of the manifestation of the picture frames are substantially the same as actual picture frames for which the template is generated. The template also includes a marker in the manifestation of each of the picture frames that indicates a position for placing a fastener on the wall to hang the picture frame. The picture frames for which the template is generated may be made by a merchant using the above-described device. Accordingly, the position of the marker is automatically determined by the system of the merchant generating the template.

The end user may request a merchant website to generate a template having a particular layout. The merchant website provides the end user with an user interface to select one of the predefined layouts or create a new layout. The end user may specify the dimensions of the picture frames (or they may be automatically determined by the merchant, knowing the selection of art and frames by the user), preview various predefined layouts for the specified picture frames, select one of the predefined layouts and/or create a new layout using various tools provided by the user interface, and purchase the template.

Some embodiments of the disclosed technique have other aspects, elements, features, and steps in addition to or in place of what is described above. These potential additions and replacements are described throughout the rest of the specification.

BRIEF DESCRIPTION OF THE DRAWINGS

One or more embodiments of the disclosed techniques are illustrated by way of example and not limitation in the figures of the accompanying drawings, in which like references indicate similar elements.

FIG. 2, which includes

DETAILED DESCRIPTION

References in this description to "an embodiment", "one embodiment", or the like, mean that the particular feature, function, or characteristic being described is included in at least one embodiment of the present invention. Occurrences of such phrases in this specification do not necessarily all refer to the same embodiment, nor are they necessarily mutually exclusive.

Disclosed here are methods, systems, paradigms and structures for wiring a picture frame (or "frame"), and for generating user defined templates for hanging picture frames wired using the device in various layouts. The device allows the maker of the frame to install a hanging wire to the frame at a predefined position, for example, at a predefined distance from a top edge of the frame so that the frame may be subsequently hung on a wall at a desired position or layout by an end user without the use of special purpose tools.

The device includes a spring-loaded peg mounted on a flat slab to hold a hanging wire at its apex when the hanging wire is drawn around the spring-loaded peg. The spring-loaded peg also allows an easy release of the hanging wire when the spring-loaded peg is pressed. The flat slab is configured to move vertically on a channel guide mounted on a wall member of the device to accommodate varying thickness of the frame. The frame is placed in the device with the top edge of the frame adjacent to the wall member. The spring-loaded peg is mounted on the flat slab at a predefined distance from the wall member. When the wire is drawn around the spring-loaded, the distance between the apex of the wire and the top edge of the frame corresponds to the predefined distance. Accordingly, the device allows the hanging wire to be attached to the frames at a predefined position.

Further, embodiments of the disclosed technique also include generating templates for hanging the picture frames on the wall in various layouts. A template may be generated, printed, or created on a flexible material, such as a paper. The template includes a manifestation (or "representation") of a plurality of picture frames in a particular layout. The dimensions of the manifestation of the picture frames are substantially the same as actual picture frames for which the template is generated. The template also includes a marker in the manifestation of each of the picture frames which indicates a position for placing a fastener on the wall to hang the picture frame. The picture frames for which the template is generated may be made by a merchant using the above described device. Accordingly, the position of the marker is automatically determined by the system of the merchant generating the template.

The end user may request a merchant website to generate a template having a particular layout. The merchant website provides the end user with an user interface to select one of the predefined layouts or create a new layout. The end user may specify the dimensions (or they may be automatically determined by the merchant, knowing the selection of art and frames by the user) of the picture frames, preview various predefined layouts for the specified picture frames, select one of the predefined layouts and/or create a new layout using various tools provided by the user interface, and purchase the template.

Figure 2A:
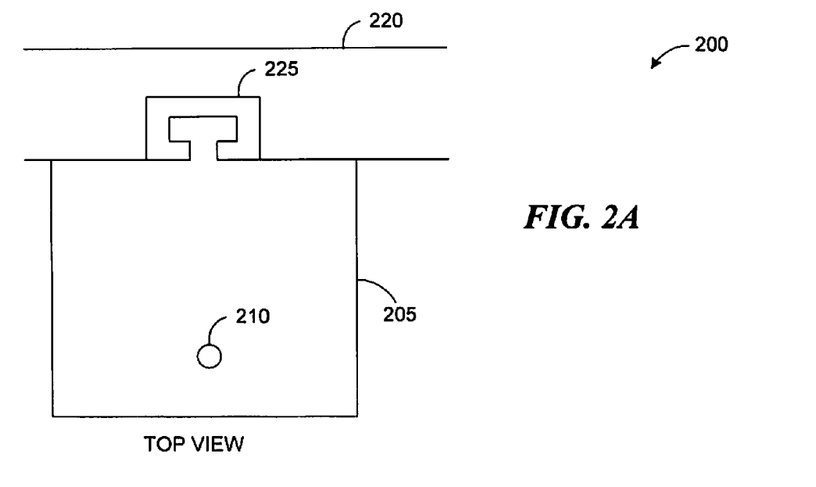
FIGS. 2(a), 2(b), 2(c) and 2(d), illustrates perspective views of a device used for wiring a picture frame.
Figures 2B, 2C:
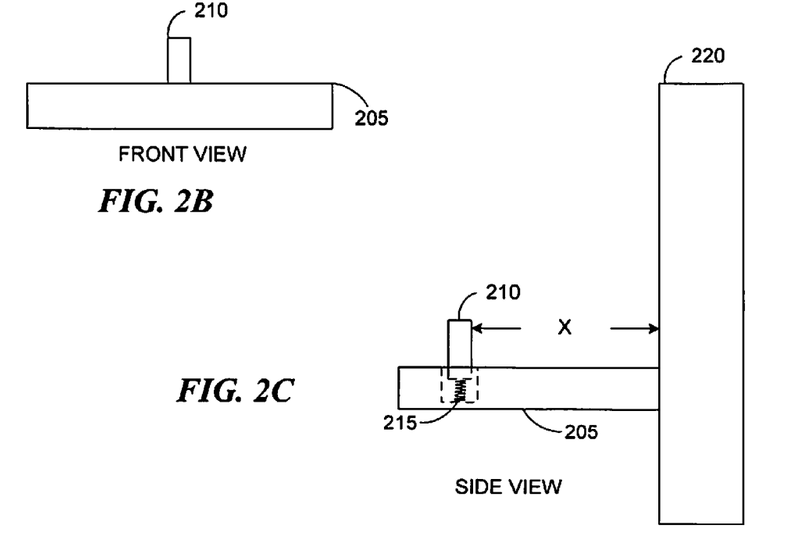
Figure 2D:
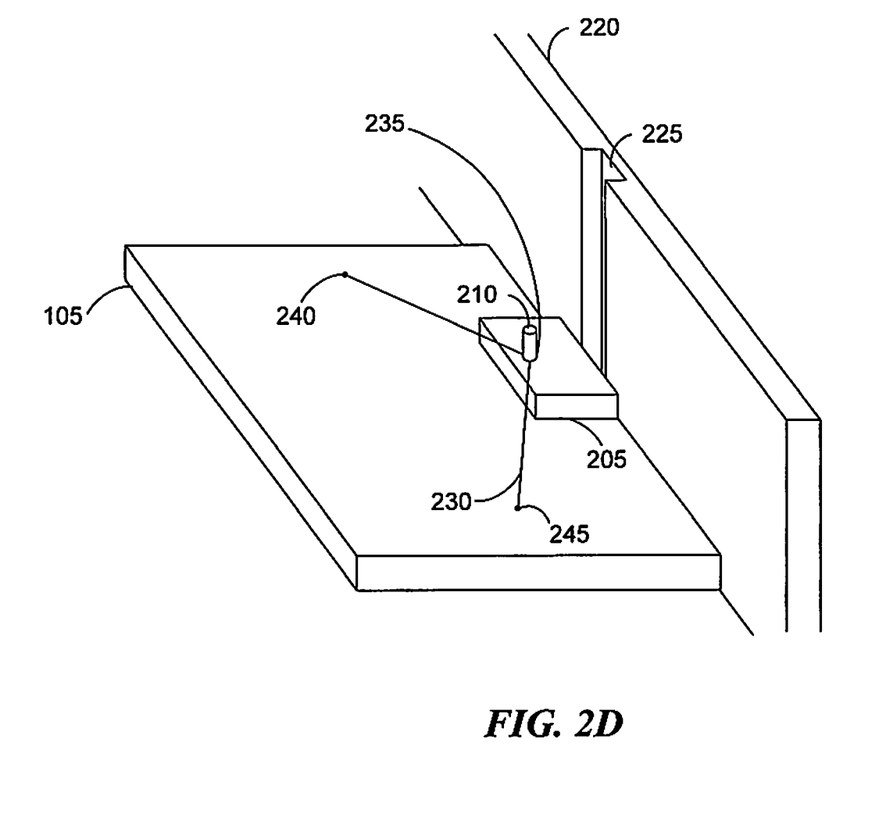

FIG. 2, which includes FIGS. 2(a)-2(d), shows various perspectives of the above described device used for wiring a picture frame, in accordance with an embodiment of the disclosed technique. FIGS. 2(a), 2(b) and 2(c) show a top view, front view and side view of the flat slab 205, respectively. The flat slab 205 has a top surface, a bottom surface opposite to the bottom surface, a front surface perpendicular to the bottom surface, and a rear surface opposite to the front surface and perpendicular to the bottom surface. The flat slab 205 moves vertically along a wall member 220 on a channel guide 225 installed on the wall member 220 to accommodate varying thickness of the picture frame 105. The flat slab 205 is connected to the channel guide 225 at the rear surface. The wall member 220 is substantially perpendicular to the bottom surface of the flat slab 205.

A spring-loaded peg 210 is mounted on the top surface of the flat slab 205. A portion of the spring 215 of the spring-loaded peg 210 sits flush in the flat slab 205 as shown in FIG. 2(c). The spring-loaded peg 210 is mounted at a predefined distance from the wall member 220. The predefined distance determines the distance between the top edge of the picture frame 105 and an apex 235 of the hanging wire 230 wired to the picture frame 105.

The device 200 ensures that the hanging wire in picture frames wired using the device 200 is at a known position, such as at a known distance from the top edge of the frames. A picture frame such as picture frame 105 can be wired using the device 200 in the following manner: The picture frame is rested on a flat surface with the front surface of the picture frame 105 facing the flat surface and the rear surface on which the hanging wire 230 is to be attached facing away from the flat surface. The flat slab 205 is moved upwards or downwards along the channel guide 225 until the bottom surface of the flat slab 205 rests on the rear surface of the picture frame 105. The hanging wire 230 is drawn from a particular point closer to a side edge of the picture frame 105, such as first point 240, to another point that is closer to the opposite side edge, such as second point 245, as shown in FIG. 2(d). The hanging wire 230 is drawn over the spring-loaded peg 210. Drawing the hanging wire 230 over the spring-loaded peg ensures that the apex 235 of the hanging wire 230 is at a known distance, which is equal to the distance between the spring-loaded peg 210 and the wall member 220, from the top edge of the picture frame 105. After the hanging wire 230 is installed, the spring-loaded peg 210 is pressed towards the top surface of the flat slab 205 to release the hanging wire 230.

The picture frames wired using the device 200 will have the hanging wire installed on the frames at a known position, and allows an end user to hang the picture frames on the wall in a desired layout without having to measure the varying positions of the hanging wire for each of the picture frames. The device 200 helps the end user to overcome the problem described with reference to FIG. 1.

Figure 3:
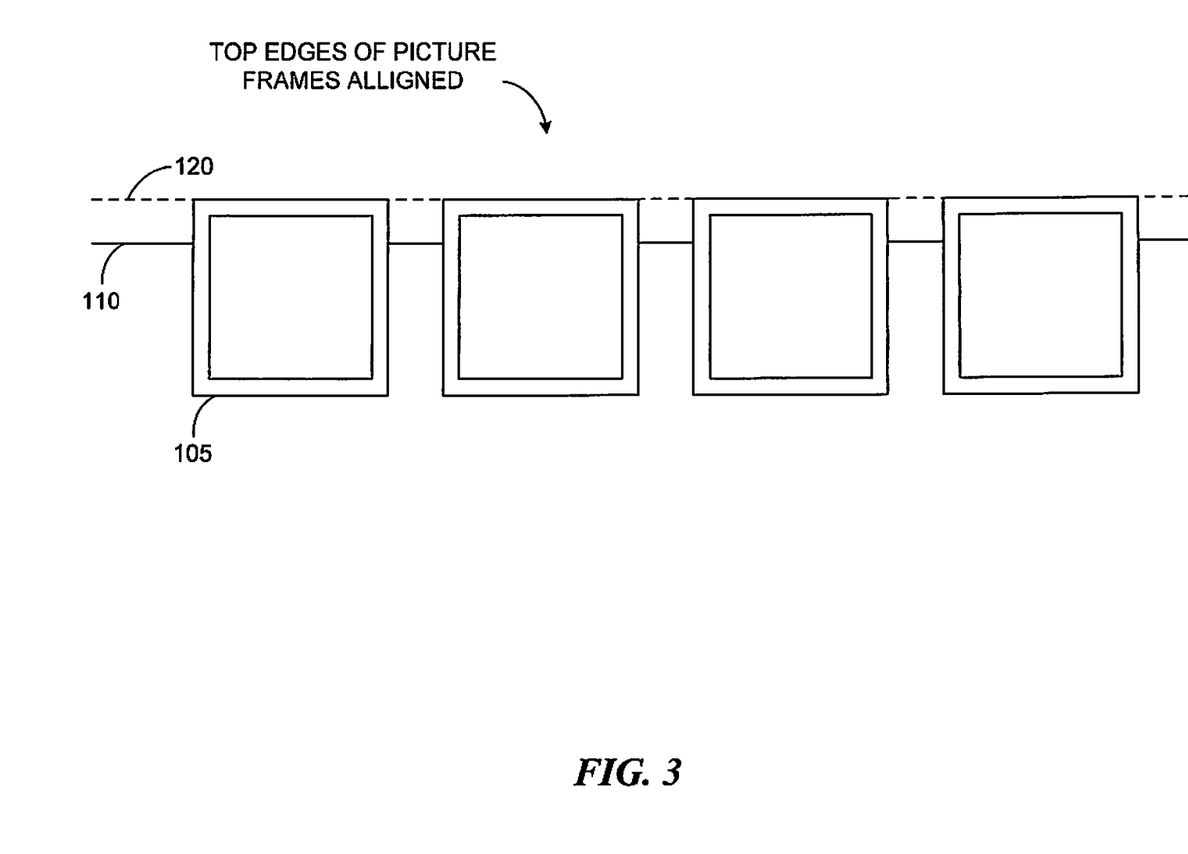
FIG. 3 is an example showing an arrangement of picture frames wired using the device of FIG. 2.

FIG. 3 illustrates an example where the picture frames 105 wired using the device 200 are installed on the wall by the end user in the desired layout. In FIG. 3, similar to FIG. 1, the end user intending to hang the picture frames 105 in a layout where the top edges of the frames 105 are horizontally aligned, installs fasteners 115 (as shown in FIG. 1) on the wall in an horizontally aligned manner as shown by horizontal line 110 in FIG. 3. The picture frames 105 wired using the device 200 are hung on the fasteners 115. The top edges of the frames 105 are horizontally aligned, as shown by horizontal line 120, since the hanging wire of each of the frames are installed at the same position from the top edge of the frames 105. Thus, the frames 105 may not be arranged in the layout the end user desired. Further, the layout remains the same, that is, the top edge of the picture frames 105 will remain aligned even if the order of the picture frames 105 are changed or switched.

Returning to FIG. 2, the distance between the spring-loaded peg 210 and the wall member 220 of the device 200 which defines the distance between the apex 235 of the hanging wire 230 and the top edge of a picture frame 105 is fixed. Additionally or alternatively, the spring-loaded peg 210 can be configured to set at one of a plurality of known distances from the wall member 220 to wire the hanging wire 230 at different positions with respect to the top edge of a frame 105. In such embodiments, the spring-loaded peg 210 is configured to move in a direction towards or away from the wall member 220 at known increments. A moving means such as the channel guide 225 may be installed on the top surface of the flat slab 205 to facilitate the movement of the spring-loaded peg 210.

The flat slab 205 can assume different shapes. In an embodiment, the flat slab 205 can be rectangular or square in shape since they are comparatively easier to make. The spring-loaded peg 210 which holds and/or releases the hanging wire 230 can also be mounted on the flat slab 205 in various other similar configurations. For example, the spring-loaded peg 210 can be a screw based peg that can be screwed into and out of the flat slab 205, a click lock peg that locks when pushed into flat slab 205 and unlocks when pulled away from the flat slab 205, etc. The means for moving the flat slab 205 vertically can also include a spring loaded mechanism which moves the flat slab 205 away from the picture frame 105 on the press of a button and towards the picture frame 105 upon release, or other similar means that aids in a vertical movement of the flat slab 205.

Figure 4:
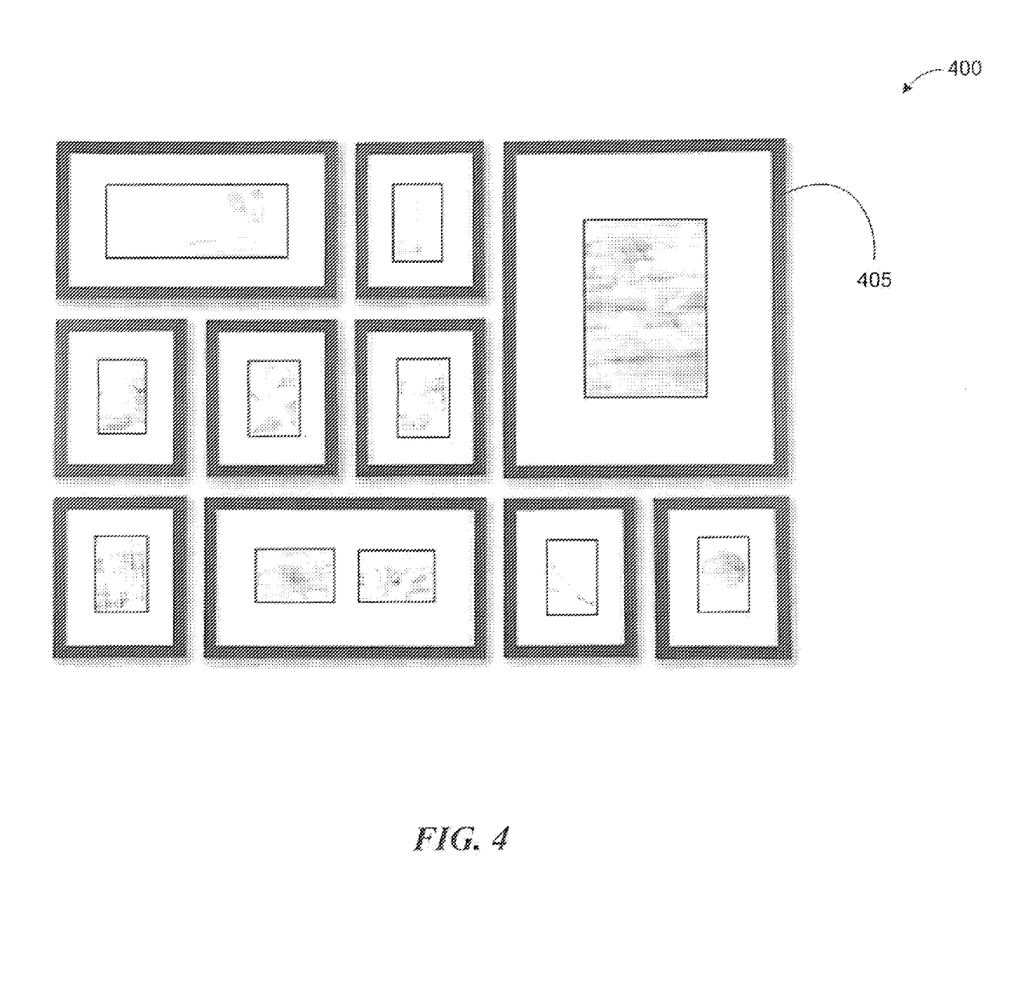
FIG. 4 illustrates an example arrangement of picture frames on a wall.

The picture frames 105 can be installed on a wall in a number of layouts. For example, the picture frames 105 can be installed in a layout such as the one shown in FIG. 4. FIG. 4 illustrates an example layout 400 of picture frames on a wall, in accordance with an embodiment of the disclosed technique. Installing the picture frames in the layout 400 can be a time consuming process for the end user as the end user has to make a lot of measurements to install the fasteners on the wall in accordance with the layout 400. Further, the installation becomes even more difficult if the picture frames are of different sizes as shown in FIG. 4.

Figure 5:
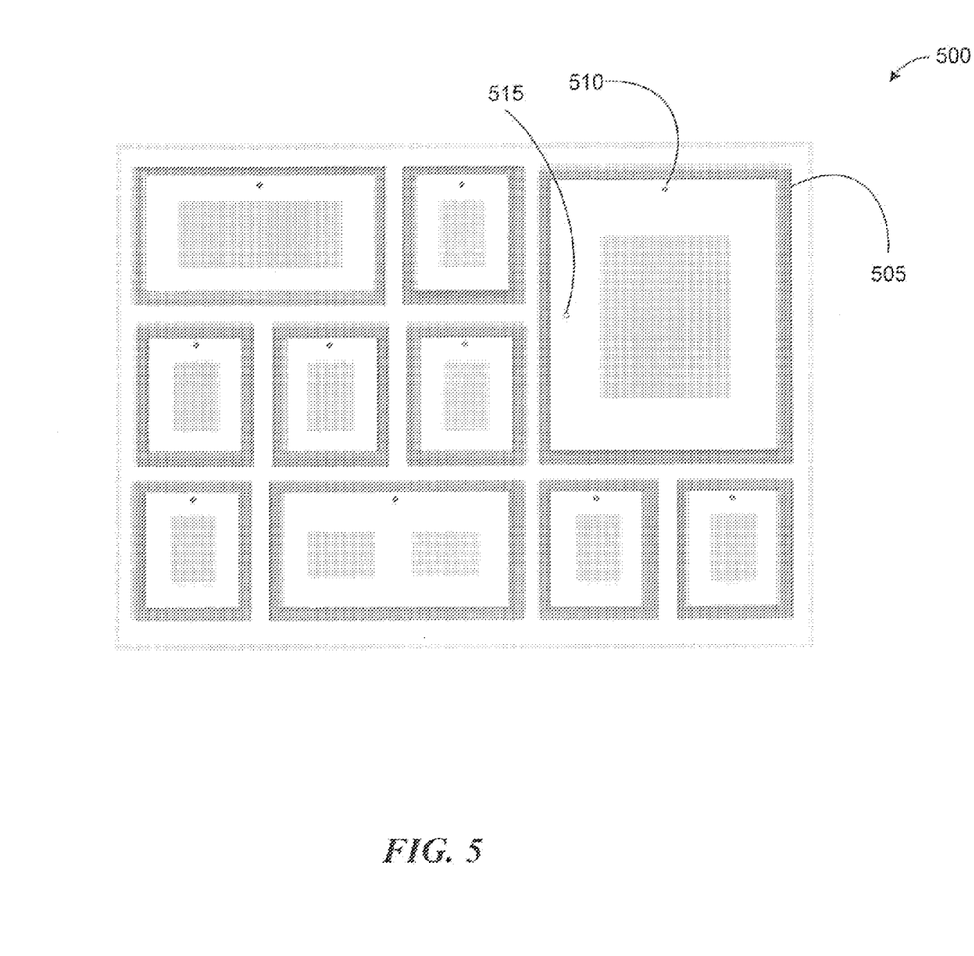
FIG. 5 illustrates a template used for hanging picture frames on the wall according to the arrangement of FIG. 4.

A template such as the template 500 shown in FIG. 5 may be used to install the picture frames on the wall in a particular layout. The template 500 aids in the installation of the fasteners for the picture frames on the wall at the right positions according to the layout 400. The template includes a manifestation of each of the picture frames 105 of FIG. 4 as arranged in the layout 400. The dimensions, such as a length and a height of the picture frame, of the manifestation of each of the picture frames are substantially the same as the dimensions of the corresponding actual picture frames. For example, the dimensions of the picture frame 405 is substantially the same as the dimensions of the manifestation 505 of the picture frame 405.

The template 500 also includes markers for placement of fasteners on the wall for each of the picture frames. For example, the manifestation 505 of the picture frame 405 includes a marker 510 to indicate the position for placement of a fastener on the wall for picture frame 405. In an embodiment, the position of the marker 510 in the manifestation 505 is determined based on the device 200 of FIG. 2. That is, the distance between the marker 510 and a top edge of the manifestation 505 corresponds to the distance between the spring-loaded peg 210 and the wall member 220 of the device 200. In one embodiment, the template 500 can be generated only with the markers, such as markers 510 and 515, for each of the picture frames. That is, the template 500 may not include the manifestation of picture frames.

The template 500 can be generated on a flexible material such as a paper or other similar that facilitates easy placement of the template 500 on the wall. The template 500 further includes a removable adhesive on the back surface of the template 500 to facilitate sticking the template 500 on the wall temporarily. In another embodiment, a tape may be used to hold the template 500 on the wall temporarily. After the template 500 is stuck to the wall, the fasteners may be installed on the wall at the position identified by the markers in the manifestation of each of the frames. The end user may then remove the template 500 and hang the actual frames on the corresponding fasteners to obtain the layout 400.

The template 500 supports installation of the picture frames in various orientations of the layout 400. For example, the end user may desire to install the picture frames in a ninety degrees clockwise orientation of the layout 400. The template 500 can be rotated ninety degrees clockwise and then stuck to the wall. The markers for the placement of the fasteners would also change accordingly. For example, in the above discussed orientation, for the picture frame 405, the fastener is installed at the position indicated by the marker 515 instead of marker 510. Accordingly, the template 500 facilitates hanging of the picture frames in various layouts and orientations on the wall easily.

In an embodiment, an art merchant/e-commerce merchant may package the template 500 with the picture frames, such as picture frames of FIG. 4, as a single product. An end user buying the picture frames from the art merchant will also receive one or more templates. However, the template can also be bought separately, and also for picture frames not sold by the art merchant. In an embodiment, the art merchant provides an online platform for creating templates. Since the different frame makers install the hanging means at different positions on the frames, the markers for the fasteners have to be placed accordingly in the template. If the templates are created for the frames sold by the art merchant, the online platform generates the templates by placing the markers as per the specification of a wiring device such as the device 200 used by the art merchant. However, if the templates are created for the frames bought from a different art merchant, the online platform can either (a) automatically determine the details of the position of the hanging means on the frames using the knowledge of the selection of art and frames by the end user, or (b) may request the end user to provide details of the position of the hanging means.

Figure 6:
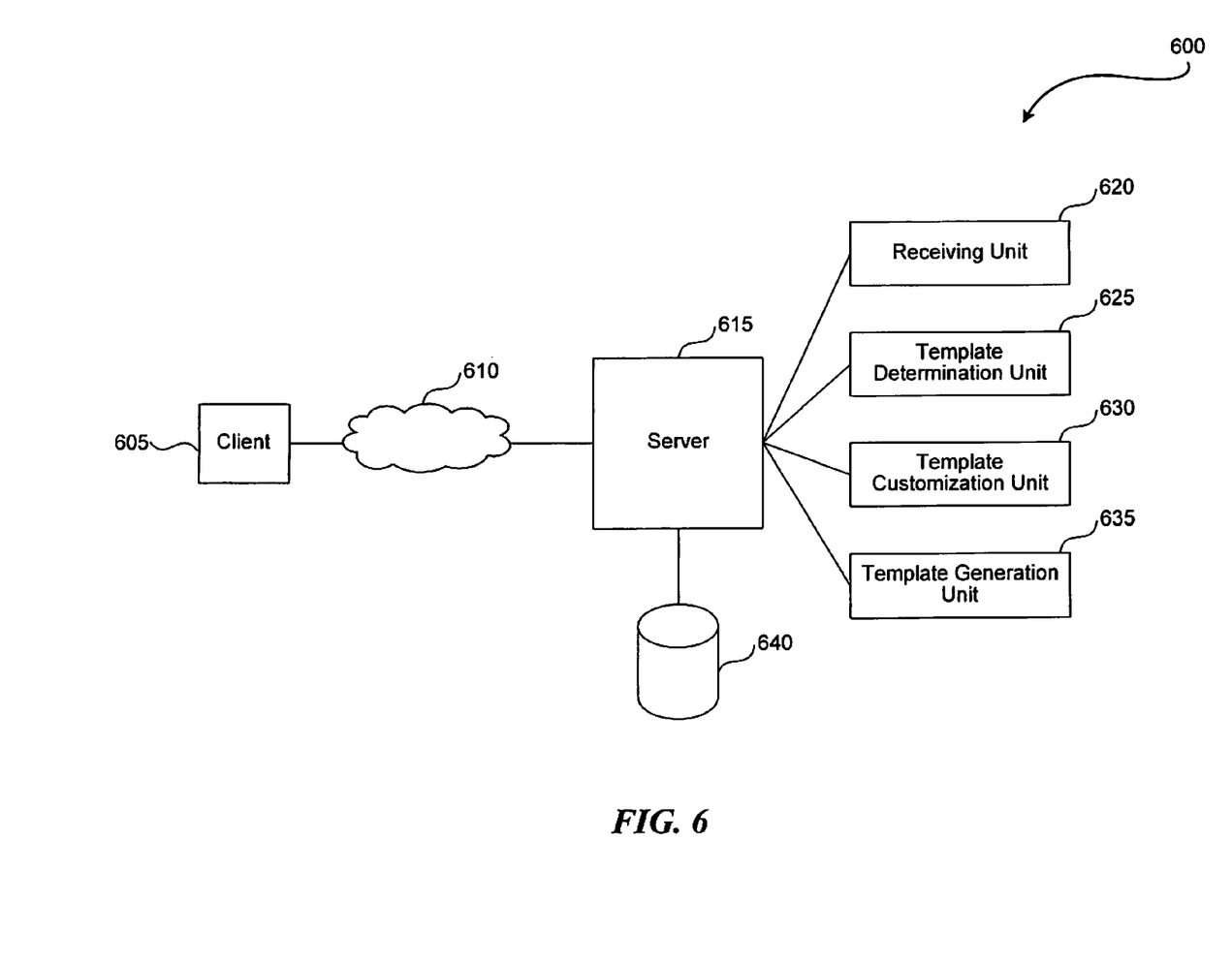
FIG. 6 is a block diagram of an architecture of a system used to generate the template of FIG. 5.

FIG. 6 is a block diagram of an architecture of a system for generating the template of FIG. 5, according to an embodiment of the disclosed technique. The system includes an online platform 600 that generates a template such as template 500 in response to a request from an end user such as client device 605. In an embodiment, the client device 605 and the online platform 600 communicate with each other over a communication network 610. The client device 605 may select one of a number of predefined templates provided by the online platform 600 or create a custom template specific to the end user's needs.

A receiving unit 620 working in cooperation with the server 615 receives the request from the client device 605. In an embodiment, the request includes instructions for either selecting a template from one of the predefined layouts or generating a custom template. The request can also include details such as a number of picture frames for which the template should be generated, dimensions such as a length and a height of each of the picture frames, and an indication of whether a maker or provider of the picture frames is a third party art merchant, that is, an art merchant other than the one providing the online platform 600.

The information regarding the art merchant can be used for determining the position of the markers for each of the frames in the template, which can be different for frames from different art merchants as described above with reference to FIG. 5. If the maker of the picture frames is a third party art merchant, the receiving unit 620 requests the client device 605 to also provide position information of the hanging means for each of the frames. In an embodiment, the position information includes a distance between the apex of the hanging wire and the top edge of the picture frame. If the maker of the picture frames is the same art merchant as the one providing the online platform 600, the online platform 600 uses the position information configured by the server 615. In an embodiment, the position information configured by the server 615 is obtained from a device such as the device 200 used by the art merchant. The position information can be stored in a database 640.

A template determination unit 625 determines a set of templates to be presented to the client device 605 based on the details of the request, such as a number of picture frames. The template determination unit 625 obtains the set of templates from the database 610 and presents to the client device 605.

Alternatively, if the client device 605 requested to create a custom-template, a template customization unit 630 provides an user interface having a set of tools to create a custom template to the client device. The client device may create a custom template using the set of tools easily. In an embodiment, the user interface can be a drag-and-drop environment having tools for (i) providing a library of manifestations of frames of different shapes, (ii) dragging the manifestation on to a drawing area, (iii) resizing the manifestation, (iv) arranging the manifestations in a desired layout, (v) providing suggestions for improving or enhancing the arrangement, (vi) providing suggestions for alternate arrangements based on the user defined arrangement, etc. In another embodiment, the user interface may also include tools for converting a digital image to a template. For example, the client device 605 may upload a digital image of a particular layout of the picture frames and include the digital image in the request for creating a custom template. The template customization unit 630 converts the digital image to a template and presents the template to the client device 605. The client device 605 may further customize the template using the user interface, for example, change the layout, a size of the manifestation of the frames, etc.

A template generation unit 635 finalizes the template selected or created by the client device 605 by the placing the markers on the manifestation of the picture frames. The template generation unit 635 generates the finalized template on a flexible material such as a paper etc. The dimensions of the manifestation of each of the picture frames in the template are substantially same as the dimensions of the actual picture frames for which the template is generated.

Figure 7:
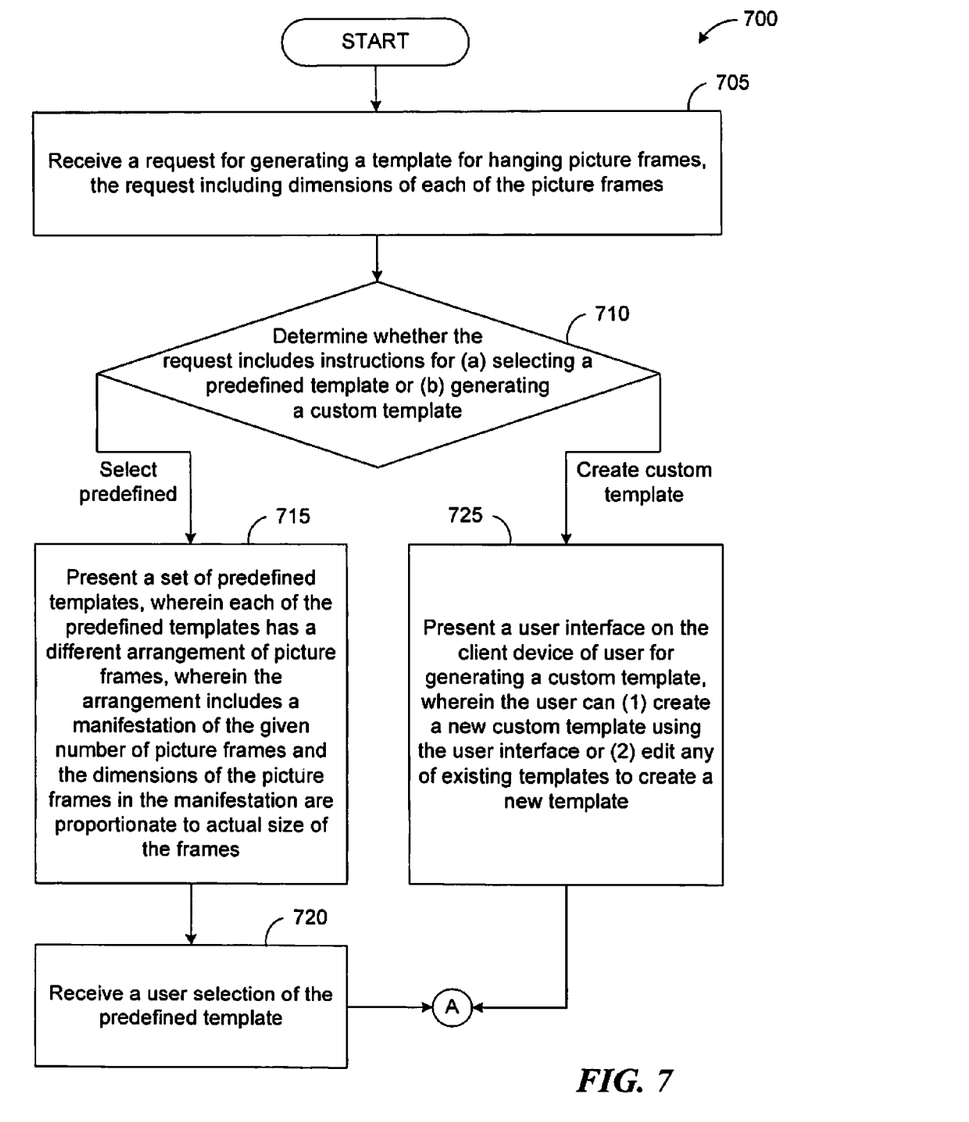
FIG. 7 illustrates a flow diagram for generating a template such as a template of FIG. 5.

FIG. 7 is a flow diagram illustrating a method 700 of generating a template such as template 500 of FIG. 5, according to an embodiment of the disclosed technique. The method 700 may be executed in a system such as online platform 600. At step 705, a receiving unit 620 receives a request from a client device 605 to generate a template for facilitating hanging picture frames on a wall. At determination step 710, the receiving unit 620 determines whether the request includes instructions for selecting from a set of predefined templates or for creating a custom-template.

Responsive to a determination that the request includes instructions for selecting from the set of predefined templates, at step 715, the template determination unit 625 presents the set of predefined templates to the device. In an embodiment, each of set of the predefined templates has a different arrangement of the picture frames and includes a manifestation of a given number of the picture frames. Further, the dimensions of the manifestation of each of the picture frames are proportional to the dimensions of the corresponding actual picture frame. At step 720, the template determination unit 625 receives a user selection of one or more of the predefined set of templates. At step 730, the user selection is stored in the database 640.

Referring back to determination step 710, responsive to a determination that the request includes instructions for creating a custom template, at step 725, the template customization unit 630 presents a user interface for generating the user customized template to the client device 605. The client device 605 can create a new custom template having a new arrangement of the picture frames or edit any of the existing set of predefined templates to create a new arrangement. The custom template is stored in a database 640, at step 730.

At step 735, the template generation unit 635 obtains the template from the database 640 and finalizes the template by placing markers in the manifestation of each of the picture frames in the template. At step 740, the template generation unit 635 generates the finalized template on a flexible material such as a paper, for use by the end user.

Though the above description describes wiring a picture frame and generating templates for hanging picture frames, the embodiments of the disclosed technique are not limited to picture frames. Picture frames should also be interpreted to include other art works such as a piece of art, an art object, a painting, or the like on which a hanging wire can be installed.

Figure 8:
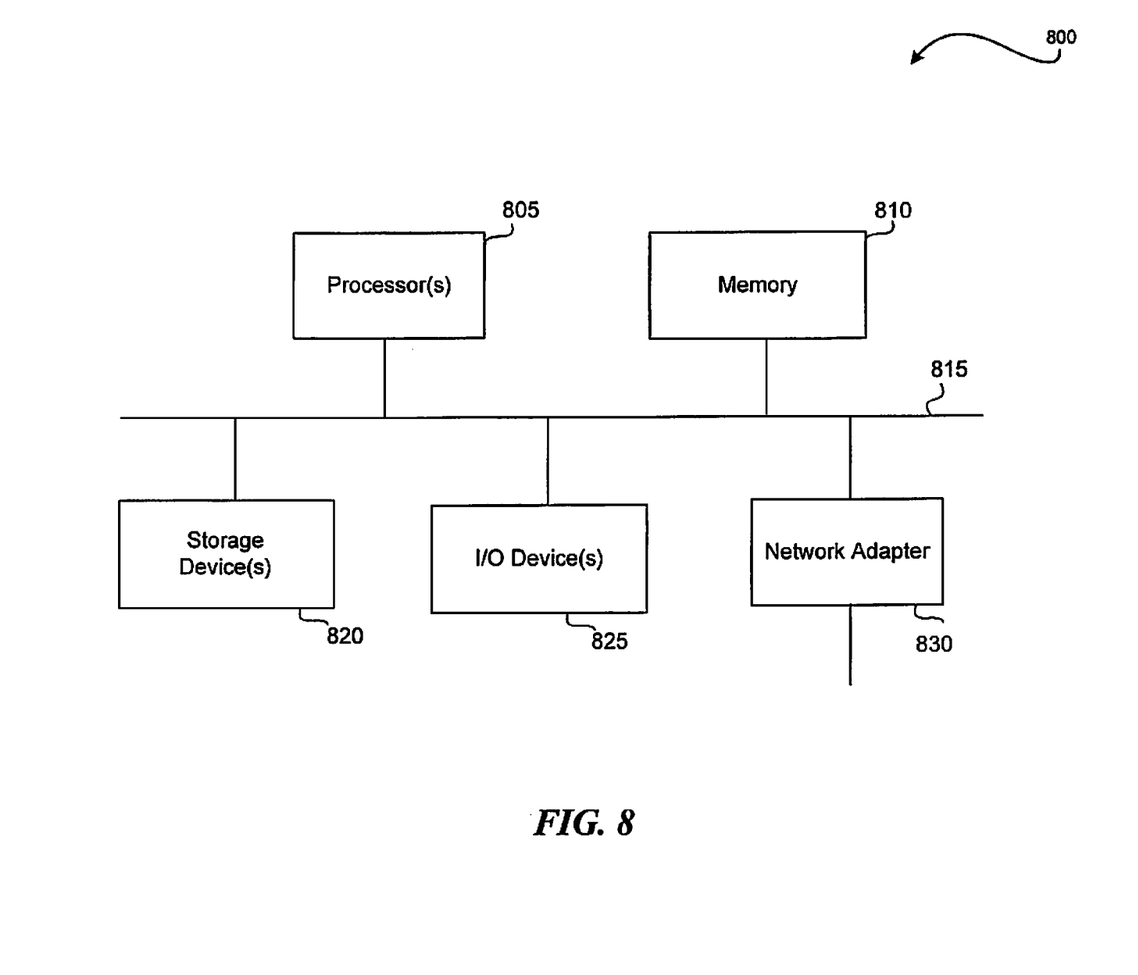
FIG. 8 is a block diagram of a processing system that can implement operations of the present invention.

FIG. 8 is a block diagram of an apparatus that may perform various operations, and store various information generated and/or used by such operations, according to an embodiment of the disclosed technique. The apparatus can represent any computer or processing system described herein. The processing system 800 is a hardware device on which any of the entities, components or services depicted in the examples of FIGS. 1-7 (and any other components described in this specification), such as client device 650, online platform 600, server 615, receiving unit 620, template determination unit 625, template customization unit 630, template generation unit 635 etc. can be implemented. The processing system 800 includes one or more processors 805 and memory 810 coupled to an interconnect 815. The interconnect 815 is shown in FIG. 8 as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 805 is/are the central processing unit (CPU) of the processing system 800 and, thus, control the overall operation of the processing system 800. In certain embodiments, the processor(s) 805 accomplish this by executing software or firmware stored in memory 810. The processor(s) 805 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 810 is or includes the main memory of the processing system 800. The memory 810 represents any form of random access memory (RAM), read-only memory (ROM), flash memory, or the like, or a combination of such devices. In use, the memory 810 may contain a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 805 through the interconnect 815 are a network adapter 830, a storage device(s) 820 and I/O device(s) 825. The network adapter 830 provides the processing system 800 with the ability to communicate with remote devices, over a network and may be, for example, an Ethernet adapter or Fibre Channel adapter. The network adapter 830 may also provide the processing system 800 with the ability to communicate with other computers within the cluster. In some embodiments, the processing system 800 may use more than one network adapter to deal with the communications within and outside of the cluster separately.

The I/O device(s) 825 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 810 can be implemented as software and/or firmware to program the processor(s) 805 to carry out actions described above. In certain embodiments, such software or firmware may be initially provided to the processing system 800 by downloading it from a remote system through the processing system 800 (e.g., via network adapter 830).

The techniques introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

A machine-accessible storage medium or a storage device(s) 820 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The term "logic", as used herein, can include, for example, programmable circuitry programmed with specific software and/or firmware, special-purpose hardwired circuitry, or a combination thereof.

What is claimed is:

1. A device comprising:
    a flat slab having at least a top surface, a bottom surface opposite the top surface, a rear surface adjacent to the bottom surface, wherein at least the bottom surface is substantially flat and adapted to rest on a surface of the picture frame to which a hanging wire is to be attached;
    a wall member having a channel guide to allow the flat slab to move in a direction perpendicular to the bottom surface of the flat slab, the flat slab coupled to the channel guide at the rear surface, the bottom surface of the flat slab being perpendicular to the wall member; and
    a spring-loaded peg mounted on the top surface of the flat slab, the spring-loaded peg mounted at a predefined distance from the wall member, the predefined distance corresponding to a distance from a top edge of a picture frame to an apex of a loop formed by an hanging wire of a picture frame when drawn over the spring-loaded peg.

2. The device of claim 1, wherein the flat slab is adapted to rest on the back of the picture frame, the flat slab resting with the bottom surface on the back of the picture frame.

3. The device of claim 1, wherein the spring-loaded peg has a first position in which the spring-loaded peg is not pressed, and a second position in which the spring-loaded peg is depressed into the flat slab.

4. The device of claim 1, wherein the spring-loaded peg is adapted to support the apex of the loop of the hanging wire in the first position, and to release the hanging wire from the peg in the second position.

5. The device of claim 1 further comprising:
    a template for hanging a plurality of picture frames on a mounting surface in a predefined layout, wherein the template is made of a flexible material, the template having a top edge, a bottom edge opposite to the top edge, a front surface and a rear surface opposite to the front surface, the template including
        a manifestation of the picture frames on the front surface in the predefined layout, wherein the manifestation of each of the picture frames is substantially the same size as the corresponding picture frame, the manifestation of each of the picture frames including a marker for placement of a fastener, the marker indicating the placement of the fastener for hanging the corresponding picture frame on the mounting surface, wherein the marker for the fastener is placed at a particular distance from a top edge of the corresponding picture frame manifestation, the particular distance corresponding to the predefined distance between the spring-loaded peg and the wall member.

6. The device of claim 5, wherein the flexible material includes a paper.

7. The device of claim 5, wherein the template further includes a removable adhesive on the rear surface for placing the template to the mounting surface.

8. The device of claim 1 further comprising:
    a template for hanging a plurality of picture frames on a mounting surface in a predefined layout, wherein the template is made of a flexible material, the template having a top edge, a bottom edge opposite to the top edge, a front surface and a rear surface opposite to the front surface, the template including
        a marker for placement of a fastener for each of the picture frames, the marker indicating the placement of the fastener for hanging the corresponding picture frame on the mounting surface, wherein the marker for the fastener is placed at a particular distance from a top edge of the corresponding picture frame, the particular distance corresponding to the predefined distance between the spring-loaded peg and the wall member.

9. A device for attaching a hanging wire to a picture frame, the device comprising:
 a flat slab having at least a top surface, a bottom surface opposite the top surface, wherein at least the bottom surface is substantially flat and adapted to rest on a surface of the picture frame on which the hanging wire is to be attached;
 means for moving the flat slab in a direction perpendicular to the bottom surface of the flat slab to accommodate varying thickness of the picture frame, and wherein the means for moving the flat slab is mounted on a wall member; and
 means for supporting an apex of a loop formed by the hanging wire of the picture frame when drawn over the means, for releasing the hanging wire after the hanging wire is attached to the picture frame, wherein the means for supporting the apex is mounted on the flat slab at a predefined distance from the wall member.

10. The device of claim 9, wherein the means for moving the flat slab is a channel guide.

11. The device of claim 9, wherein the means for supporting the apex of the loop is a spring-loaded peg.

12. The device of claim 9 further comprising:
 a template for hanging a plurality of picture frames on a mounting surface in a predefined layout, wherein the template is made of a flexible material, the template having a top edge, a bottom edge opposite to the top edge, a front surface and a rear surface opposite to the front surface, the template including:
  a manifestation of the picture frames on the front surface in the predefined layout, wherein the manifestation of each of the picture frames is substantially the same size as the corresponding picture frame, the manifestation of each of the picture frames including a marker for placement of a fastener, the marker indicating the placement of the fastener for hanging the corresponding picture frame on the mounting surface, wherein the marker for the fastener is placed at a particular distance from a top edge of the corresponding picture frame manifestation, the particular distance corresponding to the predefined distance between the spring-loaded peg and the wall member.

13. A method for wiring a picture frame, comprising:
 adjusting a flat slab of a device by moving the flat slab along a channel guide to rest a bottom surface of the flat slab on a first surface of the picture frame to which a hanging wire is to be attached, the flat slab having at least a top surface and the bottom surface, the bottom surface being opposite to the top surface and substantially flat, wherein moving the flat slab along the channel guide includes:
  moving the flat slab in a direction perpendicular to the bottom surface of the flat slab and along the channel guide that is mounted on a wall member of the device, the flat slab coupled to the channel guide at a rear surface of the flat slab, the rear surface being perpendicular to the bottom surface; and
 drawing the hanging wire, from a first location on the first surface of the picture frame to a second location on the first surface, over a spring-loaded peg mounted on the top surface of the flat slab to form a loop, the spring-loaded peg mounted at a predefined distance from the wall member, the predefined distance corresponding to a distance from a top edge of a picture frame to an apex of the loop.

* * * * *